June 25, 1957 — J. STERN — 2,796,887

HIGH VACUUM VALVE

Filed Aug. 20, 1952

INVENTOR.
JOSHUA STERN
BY Wilson R. Maltby
George Sipkin
ATTORNEYS

United States Patent Office 2,796,887
Patented June 25, 1957

2,796,887

HIGH VACUUM VALVE

Joshua Stern, Silver Spring, Md.

Application August 20, 1952, Serial No. 305,523

1 Claim. (Cl. 137—625.48)

(Granted under Title 35, U. S. Code (1952), sec. 266)

The invention described herein may be manufactured and used by or for the Government of the United States of America for governmental purposes without the payment of any royalties thereon or therefor.

The present invention relates to means for interconnecting components of a vacuum system, and more particularly to a simple high vacuum valve comprising the walls of the tubes of the system, a piston member and sealing means therefor of the type known as O rings.

Numerous previous arrangements have been employed for switching purposes in vacuum systems and in particular for sealing an evacuated area from the atmosphere, or one vacuum compartment from another vacuum compartment of less perfect vacuum. These systems in general have been complicated and expensive to construct and involve a considerable amount of machining or fabrication, and furthermore are ordinarily troublesome to use for one reason or another. For example, most vacuum valves constructed of glass have heretofore employed rotatable stoppers with ground mating tapered surfaces and a tension device to assist in maintaining contact therebetween. Such valves require a wax or grease seal and further require careful attention to assure tightness of joint each time the valve is operated. Numerous other devices are employed all of which are either complicated or fail to provide a satisfactory tight connection.

The present invention avoids the foregoing objections and provides a valving arrangement within the glass or cylindrical tubes of the system itself, such that little added material is required for the valve structure. The seal is accomplished between a piston loosely fitted within the cylindrical wall of a tube of the vacuum system and sealed thereto by means of a moderately resilient circular ring of material, designed originally as a compressible gasket, but here adapted to form a sliding seal by construction conforming to manufacturer's tolerances. When the vacuum system is made of glass standard-size tubing and provided with attachments, side tubes and fixtures connected thereto by usual glass sealing techniques, wall sections are left cylindrical and optically smooth. These surfaces are ideal for formation of the outer surface against which commercial O rings are pressed to form a slidable seal. Commercial glass tubing is sufficiently uniform that standard sizes of pistons may be formed with grooves cut therein and circumferentially thereabout in a form to receive the standard sizes of O ring and compress the same against the glass tubing. There is formed thereby a sliding valve adaptable for many purposes and to a great variety of apparatus, which valve is very inexpensive, very reliable and easy to use without danger of leakage.

It is accordingly one of the objects of this invention to provide a simple high vacuum valve, having the foregoing advantages.

Another object is to provide within the tube walls of a vacuum system a slidable valve member making a seal therewith adequate for high vacuum purposes.

A further object of the invention is to provide apparatus without ground surfaces and with means for connecting any of several compartments together or to a high vacuum pump merely by operation of a piston type valve.

A still further object of the invention is to provide a reliable high vacuum sealing means constructible by semi-skilled technicians, which is suitable for exacting vacuum requirements.

Other objects and features of the invention will become apparent to those skilled in the art as the disclosure is made in the following detailed description of a preferred embodiment of the invention as illustrated in the accompanying sheet of drawing in which.

Figure 1:
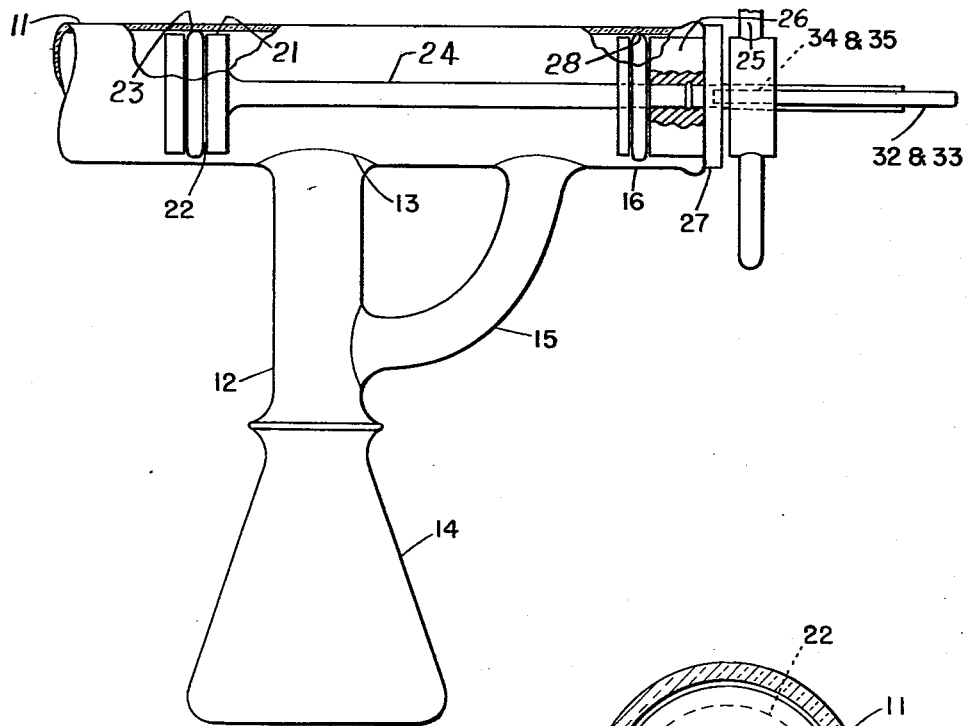
Fig. 1 shows a side elevation of a preferred embodiment of the invention.

Referring now to the drawings, wherein like reference characters designate like or corresponding parts throughout the several views, there is shown in Fig. 1 a portion of the vacuum system including a main tube 11 connected to a high vacuum pump and having a side tube 12 connected thereto by conventional sealing means at 13 and extending to a chamber 14 which it is desired to maintain under specified vacuum conditions. A further side tube 15 is illustrated as connecting between the tube 12 and an extension of tube 11 at 16. The tube 15, and the extension of tube 11 to which the connections are made, are not essential to the operation of the valve but are convenient in providing sufficient space for effective operation thereof and for the piston controlling fixtures presently to be described, providing back pressure relief.

Within the tube 11 there is shown a piston 21 having a circumferential U groove 22 adapted to receive and support an O ring 23. The piston is provided with a piston operating shaft or piston rod 24, extending through the open end of the tube 11. The piston rod, if desired, may be provided with an operating handle 25 of the form illustrated, or with a finger loop, or other handle as may be convenient. The open end of tube 11 is preferably supplied with a closure member 26 which may be generally of the same construction as the piston and has circumferentially thereabout a U groove containing an O ring 28 of the same size as ring 23. The member 26 has stop means 27 at the other end thereof to locate the same in the tube 11.

Within the closure member 26 is a bore 31 of size sufficient to receive the piston rod 24 with considerable clearance. Also the closure member 26 has circumferentially disposed therein a reversed U groove also receiving an O ring which forms a seal with the piston rod sliding therethrough. Rotation fixing means is provided being attached to the closure member 26 and illustratively comprising parallel rod members 32 and 33 cooperating with parallel spaced holes 34 and 35 in member 26 and disposed oppositely about the piston rod 24. This arrangement provides means maintaining rotational alignment, which may be desired when the sealing means is employed in tubing other than glass, and may not be perfectly round. Likewise, the internal O ring 36 sealing closure member 26 and piston rod 24 may sometimes be rotationally fixed with some advantage in reliability of sealing accomplished thereby.

Figure 2:
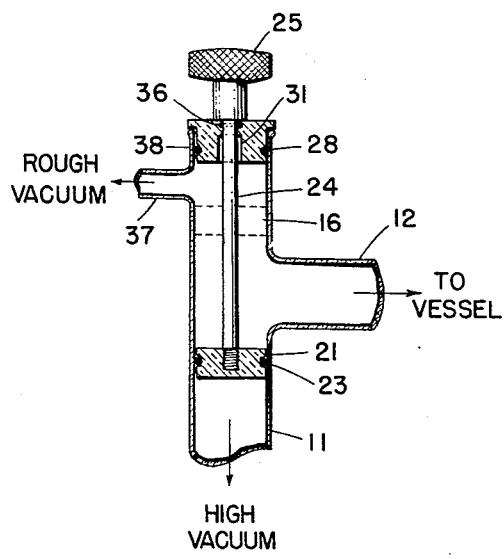
Fig. 2 illustrates an alternate construction of the invention.

The modification of Fig. 2 illustrates O ring sealing means effective as a three-way valve wherein the tube 11 is provided with a rough vacuum pump connected to the system through a side tube 37 spaced adjacent closure member 26 and leaving a straight-sided portion of tube 11 at 38 for formation of a seal, as shown by the dotted line position of piston 21. The chamber to be evacuated is connected to an extension of tube 11 opposite the closure member. For rough evacuation of the system the piston is inserted so as to seal off the high vacuum pump, as illustrated in solid line position. When connection has been made and sealing of the system completed, the mechanical vacuum pump is operated to exhaust the system to the extent practicable therewith. It is then convenient to withdraw piston 21 to the position shown in dotted line, thereby sealing the system from the mechanical vacuum pump and connecting the high vacuum pump thereto. This arrangement is particularly convenient and illustrates an important advantage of the simplicity of the valve herein disclosed, in that the chamber attached to tube 12 may be of the openable type designed to receive specimens which must be frequently removed or replaced by other specimens. Under these conditions ordinary vacuum valves are inadequate and inefficient in contrast to the present arrangement where a simple operation of a piston performs effective sealing and system switching in the matter of a second or two with complete reliability. Employing the three-way valve greatly facilitates change of specimens in that the valve arrangement permits operation of the high vacuum pump continuously without contamination by influx of air as the remainder of the system is filled with air during replacement of the specimens.

Figure 3:
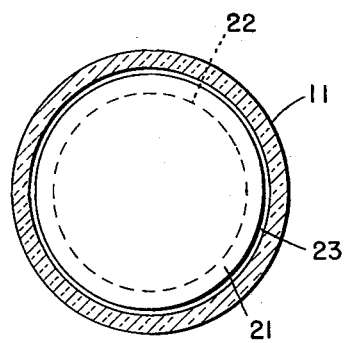
Fig. 3 shows a typical O ring and further shows, by way of illustration, the tube diameter within which such an O ring forms a seal.

In Fig. 3 details of the construction of a suitable piston and O ring to cooperate with a particular tube diameter are illustrated. O rings 23, 28 and 36 are ordinarily made of neoprene or other grease resistant resilient material. While such rings form an effective seal without the usual high vacuum wax, grease or oil, the operation of the valve is improved both as to ease of sliding and reliability of results by the employment of a suitable vacuum oil or grease. Care must be taken that the oil or grease is not absorbed by the material of the O ring, since this might cause swelling of the O ring and failure to seal at the internal diameter surface thereof. When neoprene is employed, silicone grease is a suitable lubricant and permits operating of the system without trouble for months or years regardless of the frequency of operation.

Various modifications are contemplated and may obviously be resorted to be those skilled in the art without departing from the spirit and scope of the invention, as hereinafter defined by the appended claim, as only preferred embodiments thereof have been disclosed.

What is claimed is:

A vacuum system having a main tube adapted to be connected to a high vacuum pump and having an extension portion integral therewith, a chamber, a first side tube coupling said chamber and said main tube, a second side tube coupling said first side tube and said extension portion of the main tube to provide a back pressure relief for the system, a piston within said main tube and slidably coacting therewith, said piston having a circumferential piston U groove and a shaft with an axis coinciding with the axis of said main tube, a piston O ring coacting with said piston U groove and the inside surface of said main tube to provide a high vacuum valve between said main tube and said chamber, said extension portion of said main tube having an open end, a cylindrical closure member within said open end and having a circumferential closure U groove thereon, a first O ring coacting with said closure U groove and the inside surface of said open end for establishing a pressure seal thereon, said closure member having stop means coacting with said open end for maintaining a fixed relationship therebetween, said closure member having an axial bore adapted to slidably receive said shaft with clearance therebetween, said axial bore having a reversed U groove therein, a second O ring coacting with said reversed U groove and said shaft to provide a pressure seal between said closure member and said shaft, a rotation fixing means associated with said closure member and said shaft for maintaining rotational alignment therebetween.

References Cited in the file of this patent
UNITED STATES PATENTS

| 1,814,121 | Brown | July 14, 1931 |
| 2,240,074 | Kain | Apr. 29, 1941 |
| 2,394,364 | Christensen | Feb. 5, 1946 |
| 2,524,142 | Seeloff | Oct. 3, 1950 |
| 2,563,729 | Longsworth | Aug. 7, 1951 |

OTHER REFERENCES

Handbook on Synthetic Rubber Packings, E. F. Houghton & Co. Philadelphia, Pa., fifth ed., 1952. (Copy in Scientific Library.)